United States Patent [19]

Slater

[11] 3,920,579

[45] Nov. 18, 1975

[54] SYNTHESIS GAS PRODUCTION BY PARTIAL OXIDATION

[75] Inventor: William L. Slater, La Habra, Calif.

[73] Assignee: Texaco Inc., New York, N.Y.

[22] Filed: Apr. 24, 1974

[21] Appl. No.: 463,710

[52] U.S. Cl. .................. 252/373; 75/119; 75/121; 423/65; 423/140; 252/372
[51] Int. Cl.² .......................................... C01B 2/14
[58] Field of Search ...... 252/373, 372; 75/119, 121; 423/140, 65

[56] References Cited

UNITED STATES PATENTS

| | | | |
|---|---|---|---|
| 2,754,187 | 7/1956 | Bond et al. | 252/373 X |
| 2,893,941 | 7/1959 | Kohfeldt et al. | 208/113 X |
| 3,097,081 | 7/1963 | Eastman et al. | 252/373 X |
| 3,528,930 | 9/1970 | Schlinger et al. | 252/373 X |
| 3,607,157 | 9/1971 | Schlinger et al. | 252/373 X |

Primary Examiner—Howard T. Mars
Attorney, Agent, or Firm—Thomas H. Whaley; Carl G. Ries; Albert Brent

[57] ABSTRACT

Compounds of Group I alkali metals i.e., Na, K, Li, or mixtures thereof are added to the feed to the reaction zone of a partial oxidation synthesis gas generator in order to raise the level of said alkali metals to a value in the range of about 350 to 13,000 parts per million (basis weight of hydrocarbonaceous fuel feed), or more. By this means, the partial oxidation reaction may be improved. Soot formation is reduced or oxygen consumption is decreased, or both. Further, the subject process may be useful for the recovery of naturally-occurring metal values that may be present in the hydrocarbonaceous fuel feed. Thus heavy metal compounds of Ni, V, and Fe in the hydrocarbonaceous fuel may be fluxed with said alkali metals in the reaction zone of the gas generator to facilitate their separation from the process gas stream, and to extend the life of the refractory lining of the reaction zone.

11 Claims, No Drawings

SYNTHESIS GAS PRODUCTION BY PARTIAL OXIDATION

BACKGROUND OF THE INVENTION

1. Field of the Invention

This invention relates to the production of synthesis gas by partial oxidation of a hydrocarbonaceous fuel. More particularly it relates to improvements in the partial oxidation process for generating gaseous mixtures comprising principally hydrogen and carbon monoxide, and to improvements in the recovery of naturally occurring metal values from the hydrocarbonaceous fuel feed.

2. Description of the Prior Art

Organic compounds containing combined oxygen, such as isobutyraldehyde and molasses, have been previously supplied in admixture with the hydrocarbon fuel to a free-flow non-catalytic partial oxidation synthesis gas generator to reduce the soot yield in the effluent gas stream or to reduce the consumption of free-oxygen. The aforesaid materials are consumed in the process, and do not protect the aluminum oxide refractory lining the reaction zone of the gas generator from damage from naturally occurring heavy metals in the hydrocarbonaceous fuel e.g., Ni, V, Fe and their reaction compounds which may combine with the refractory to form spinels having a structure different from that of the original refractory and cause it to spall.

SUMMARY

In a continuous process for the production of gaseous mixtures comprising $H_2$, CO, $CO_2$, $H_2O$ and optionally gases from the group $H_2S$, COS, $CH_4$, Ar, $N_2$ and mixtures thereof along with particulate carbon by the partial oxidation of a hydrocarbonaceous fuel containing less than about 300 parts per million (basis weight of said hydrocarbonaceous fuel) of alkali metals from the group Na, K, Li, or mixtures thereof with a free-oxygen containing gas in an amount providing an atomic ratio of oxygen to carbon in the hydrocarbonaceous fuel in the range of about 0.8 to 1.1 in the presence of a temperature moderator, said partial oxidation reaction taking place in the free-flow unpacked reaction zone of a gas generator at an autogenous temperature in the range of about 1,500° to 3,500°F. and a pressure in the range of about 1 to 200 atmospheres, the improvement comprising introducing into said reaction zone along with said reactants a supplemental amount of alkali metal compounds from the group Na, K, Li or mixtures thereof to raise the level of said alkali metals in the reaction zone to above about 350 parts per million (basis weight of hydrocarbonaceous fuel).

DESCRIPTION OF THE INVENTION

The present invention pertains to an improved continuous process for the production of gaseous mixtures principally comprising $H_2$, CO, $CO_2$, $H_2O$ and optionally containing gases from the group $H_2S$, COS, $CH_4$, Ar, $N_2$ and mixtures thereof along with about 0.01 to 20 wt. % particulate carbon (basis carbon in the fuel) by the partial oxidation of a hydrocarbonaceous fuel with a free-oxygen containing gas in the presence of a temperature moderator, e.g., steam, and a supplemental amount of an alkali metal from Group I of the Periodic System of Elements i.e., Na, K, Li, and mixtures thereof. By the addition of alkali metal compounds to the feedstreams to the synthesis gas generator it has now been found that the utilization of oxygen in the generation of carbon monoxide is improved. The production of particulate carbon, at a given oxygen rate is reduced by the presence of the alkali metals. Alternatively, the oxygen feed rate may be reduced for a given rate of carbon production. In addition, the alkali metal helps protect the aluminum oxide refractory lining the reaction zone of the gas generator from attack by heavy metals such as Ni, V, or Fe or their compounds contained in the hydrocarbonaceous fuel supplied to the gas generator.

In the subject process, a continuous stream of mixed gases is produced in a refractory lined reaction zone of a free-flow unpacked gas generator by the partial oxidation of hydrocarbonaceous fuel with oxygen. The gas generator preferably comprises a free-flow vertical steel pressure vessel having a refractory lining, such as described in coassigned U.S. Pat. No. 3,097,081 issued to DuBois Eastman et al. The feedstreams to the gas generator are introduced into the reaction zone of the gas generator by means of a suitable burner. Suitably, a single annulus-type burner, such as described in coassigned U.s. Pat. No. 2,928,460 issued to DuBois Eastman et al., or a multiple annulus burner, as shown in coassigned U.S. Pat. No. 3,705,108 issued to C. P. Marion et al., may be employed.

The feedstreams are reacted in the gas generator at an autogenous temperature in the range of about 1,500° to 3500°F. and at a pressure in the range of about 1 to 200 atmospheres. The reaction time in the gas generator is about 1 to 20 seconds.

A wide range of carbon-containing organic materials or hydrocarbonaceous fuels, may be reacted in the gas generator to produce the synthesis gas. The term "hydrocarbonaceous fuel," as used herein to describe various suitable feedstocks, is intended to include gaseous, liquid, and solid hydrocarbons, carbonaceous materials, and mixtures thereof, which singly or in admixture with one another are capable of sustaining an autogenous, uncatalized reaction with oxygen to produce carbon monoxide. The process of this invention is applicable to those hydrocarbonaceous fuels which contain less than about 300 parts per million (ppm) (basis weight of said hydrocarbonaceous fuel) of a Group I alkali metal from the group Na, K, Li and mixtures thereof. For example, there are (1) pumpable slurries of solid carbonaceous fuels, such as coal, particulate carbon, petroleum coke, concentrated sewage sludge, and mixtures thereof in water, oil, or water and oil emulsions; (2) gas-solid suspensions, such as finely ground solid carbonaceous fuels dispersed in either a temperature-moderating gas or in a gaseous hydrocarbon; and (3) gas-liquid-solid dispersions, such as atomized liquid hydrocarbon fuel and particulate carbon dispersed in a temperature-moderating gas.

The term liquid hydrocarbon, as used herein to describe suitable liquid feedstocks, is intended to include various materials, such as liquefied petroleum gas, crude oil, crude residua, heavy distillates from crude oil, asphalt, gas oil, tar-sand and shale oil, coal oil, aromatic hydrocarbons (such as benzene, toluene, xylene fractions), coal tar, cycle gas oil from fluid-catalytic-cracking operation; furfural extract of coker gas oil; and mixtures thereof. Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof. Both gaseous and liquid feeds may be mixed and used simultaneously and may include paraffinic, olefinic, naphthenic and aromatic compounds in any proportion.

Also, included within the definition of the term hydrocarbonaceous fuels are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

The hydrocarbonaceous feed may be at room temperature or it may be preheated to a temperature up to as high as about 600°F. to 1,200°F., but preferably below its cracking temperature. The hydrocarbonaceous feed may be introduced into the burner in liquid phase or in a vaporized mixture with a temperature moderator.

The use of a temperature moderator to moderate the temperature in the reaction zone depends in general on the carbon to hydrogen ratio of feedstock and the oxygen content of the oxidant stream. A temperature moderator may not be required with some gaseous hydrocarbon fuels; however, generally one is used with liquid hydrocarbon fuels and with substantially pure oxygen. As previously mentioned, the temperature moderator may be introduced into the synthesis gas generator in admixture with either or both reactant streams. Alternatively, the temperature moderator may be introduced into the reaction zone of the gas generator by way of a separate conduit in the fuel burner. Suitable temperature moderators include $H_2O$, $CO_2$-rich gas, cooled clean gas from the gas generator or from a gas turbine which may be employed downstream in the process with or without admixture with air, by-product nitrogen from the air separation unit to be further described, and mixtures of the aforesaid temperature moderators.

The term free-oxygen containing gas, as used herein, is intended to include air, oxygen-enriched air, i.e., greater than 21 mole % oxygen, and substantially pure oxygen i.e., greater than 95 mole % oxygen (the remainder comprising $N_2$ and rare gases). Free-oxygen containing gas may be introduced into the burner at a temperature in the range of about ambient to 1200°F. The ratio of free-oxygen in the oxidant to carbon in the feedstock (O/C atom/atom) is in the range of about 0.80 to 1.1, and preferably about 0.84 to 0.97. Substantially pure oxygen is preferred to reduce the amount of nitrogen and other gaseous impurities in the product gas.

It was found unexpectedly that when the total amount of sodium, potassium and lithium ions in the hydrocarbonaceous fuel and water fed to the reaction zone of a partial oxidation synthesis gas generator is less than about 300 parts per million (ppm), the partial oxidation reaction may be improved by adding a compound from the Group I alkali metals selected from the group consisting of Na, K, Li, and mixtures thereof to one or more of the charge streams to the gas generator to raise the level of the total amount of said alkali metals in the reaction zone to a value in the range of about 350 to 13,000 ppm., or more. There is no economic advantage for adding more than 13,000 ppm of said alkali metals. By this means soot formation may be reduced for a specific ratio of free-oxygen in the oxidant to carbon in the feedstock (O/C atomic ratio). Conversely, for a given level of soot production, the O/C atomic ratio may be reduced. Preferably, the soot level is kept above 1.0 wt. % (basis wt. of total C in the generator feed).

Compounds of sodium, lithium, and potassium which are suitable for practicing the subject invention include the carbonates, bicarbonates, hydroxides, silicates, sulfates, sulfites, aluminates, stearates, oleates, naphthenates, acetates, and borates. Hydrates of said compounds, and suitable waste products rich in aforesaid compounds may also be used. The alkali metal halides are less preferred and generally should be avoided to avoid halide corrosion of stainless steel or other ferroalloys in subsequent processing equipment, e.g., in the quench and purification systems.

Liquid and solid hydrocarbonaceous fuels which may be used in the subject process include petroleum fuels containing naturally occurring heavy metal compounds, such as crude oil, crude residua, heavy distillates from crude oils, and petrolum coke containing vanadium, nickel, and iron. During the partial oxidation of fuels containing heavy metals, in addition to the desired product gas, particulate carbon (soot) and nickel, vanadium, iron and their reaction compounds are produced in the reaction zone of the gas generator. These metals tend to attack the refractory lined walls of the reaction zone. Generally, the refractory comprises aluminum oxide. Ni, Fe, and V combine with the refractory to form spinel type compounds having structures different from that of the original refractory. Nickel and vanadium are particularly destructive, combining with the alumina refractory to form crystalline $NiO \cdot Al_2O_3$ and $V_2O_3 \cdot Al_2O_3$ which cause spalling of the alumina refractory. At a temperature in the range of about 1,500° to 3500°F. and at a preferred operating temperature in the reaction zone of about 1,800° to 2800°F., the refractory may spall and deteriorate in a relatively short time, in some cases, within a few hours.

In the partial oxidation process, the refractory walls in the gas generator are protected from attack from Ni and V by liberating sufficient carbon contained in the hydrocarbonaceous fuel feed as particulate carbon (free carbon soot) to sequester the metals and their reaction products and carry them out of the reaction zone. However, the production of excess soot requires the installation of complex equipment for scrubbing the effluent gas stream and for recovering the carbon for introduction into the gas generator as a portion of the feed.

The presence of the alkali metals in the reaction products also helps protect the refractory lining of the reaction zone from attack by the heavy metals, V, Ni, and Fe. Thus, when the compounds of sodium, potassium, lithium or mixtures thereof are introduced into the reaction zone of the gas generator they appear to act as flux for nickel, vanadium, iron and other ash materials on the surface of the refractory. Furthermore, the flux apparently glazes and seals the refractory wall surface thereby helping to protect it from attack by the heavy metal compounds. Advantageously, the gas generator can now be operated at a lower soot level than previously considered possible without damaging the the refractory walls.

Entrained in the effluent stream of synthesis gas leaving the reaction zone are particulate carbon; and alkali metal compounds from a group consisting of compounds of Na, K, Li and mixtures thereof; and compounds from the group consisting of nickel, vanadium, iron, and mixtures thereof. This hot effluent gas stream from the reaction zone is quenched in water in the quench zone. A suitable quench tank is shown in coassigned U.S. Pat. No. 2,896,927.

Alternatively, the hot effluent gas stream may be passed through a waste heat boiler in indirect heat exchange with water. The cooling water is converted to steam and the process gas stream is cooled to a temperature in the range of about 500° to 900°F. The process gas stream is then scrubbed with water in a conventional gas scrubbing zone to remove suspended particulate carbon and other solid particles.

In a preferred embodiment, a carbon-water suspension from the quench and the gas scrubbing zones is introduced into a separation zone (decanter) where it is contacted with a light hydrocarbon fluid such as naphtha or kerosene. The carbon is separated from the water and forms a carbon-naphtha dispersion which floats on the water. The compounds of Na, K, and Li dissolve in the water; and the compounds of Ni, V, Fe and mixtures thereof form a flocculent suspension in the water. The carbon-naphtha layer may be drawn off and mixed with a heavy hydrocarbonaceous fuel oil such as crude oil. This mixture is separated by distillation into a naphtha fraction which is recycled to the separation zone (decanter) and a slurry of carbon and heavy hydrocarbonaceous fuel which is supplied to the gas generator as a portion of the feed.

The flocculent suspension comprising compounds of Ni, V, Fe and mixtures thereof in water may be separated by conventional means e.g., filtration, settling. The water containing alkali metal ions from the group Na, K, Li, and mixtures thereof at a pH in the range of 6 to 10 is recycled to the gas generator as a portion of the water temperature moderator. Other portions of this water may be recycled to the quench and scrubbing zones.

The mixtures of heavy metals recovered by the subject process may be recovered as a valuable by-product of the process.

EXAMPLES

The following examples are offered as a better understanding of the present invention, but the invention is not to be construed as limited thereto.

EXAMPLE I

Run No. 1 represents conventional practice. On an hourly basis about 589 pounds of a hydrocarbonaceous fuel consisting of California vacuum residuum feestock at a temperature of 290°F. are introduced into a free-flow non-catalytic synthesis gas generator by way of an annulus-type burner. The oil feedstock has an API gravity of 5.3 a viscosity of 7000 Saybolt Seconds Furol at 122°F., and a heat of combustion of 17,831 BTU (British Thermal Units) per pound. The oil feestock has the following ultimate analysis in weight %: C 85.92, H 10.99, N 0.89, S 3.00, and ash 0.10. The oil typically comprises, in parts per million (ppm), Ni 75, V 100 and Fe 90. Simultaneously, 575 pounds of substantially pure oxygen (99.5% $O_2$) at a temperature of 60°F., are charged into the gas generator. The weight ratio $H_2O$/fuel is 0.186 and the atomic ratio of oxygen in the substantially pure oxygen to carbon in the fuel is 0.851. The reactants introduce less than a total of 300 ppm of compounds of the group Na, K, Li, or mixtures thereof into the reaction zone.

Reaction takes place between the feedstreams in the reaction zone at a pressure af about 1010 pounds per square inch gauge (psig) and at an autogenous temperature of 2150°F. The average residence time in the 2.12 cubic ft. reaction zone is about 3.9 seconds. By the partial oxidation reaction, the hydrocarbonaceous feedstream is converted into 26,165 SCFH of an effluent gas stream (dry basis) having the following dry gas composition in mole percent: CO 51.61, $H_2$ 43.75, $CO_2$ 2.74, $CH_4$ 1.25, $N_2$+Ar 0.18 and $H_2S$ 0.46. In addition, 48.42 pounds per hour of particulate soot containing 94.49 weight percent carbon is entrained in the effluent gas stream from the gas generator. This represents 9.04 weight percent unconverted carbon basis weight of total carbon in the feed.

The process gas stream leaving the gas generator is cooled to a temperature of 600°F. by direct quenching in water in a quench tank. Soot in the process gas stream is removed by the turbulent quench water and a carbon-water slurry is produced. The remaining soot is scrubbed from the process gas stream by conventional means in a gas scrubber. Substantially all of the Ni, V, and Fe in the hydrocarbonaceous fuel is separated from the process gas stream along with the soot.

Run No. 2 is similar to Run No. 1 but the O/C atomic ratio and the $H_2O$/fuel are increased, and the corresponding amount of soot make is decreased. A summary of Runs 1 and 2 are shown in Table I.

EXAMPLE II

Run numbers 3-5 illustrate the method of the subject invention. These runs are conducted in substantially the same manner as described previously for Run No. 1, except that supplemental sodium ions are included in the feed to the generator. In Run 5, all of the sodium ions are contained in zeolite treated water, the sodium replacing calcium and magnesium in the available water supply to the plant. In Runs 3 and 4, additional sodium is added as sodium carbonate (soda ash). The atomic ratio O/C is varied over a range of 0.87 to 0.91.

The results for Runs 1-5 are summarized in Table I. Comparison of Runs 4 and 5 show the effect of increasing the concentration of sodium ions in the water feed to the partial oxidation generator. The O/C atomic ratio is reduced from about 0.91 to 0.87, a reduction of oxygen requirements by about 5 percent, when the sodium ion content of the feed water is increased from 460 ppm to 4100 ppm. Conversely, for a fixed O/C atomic ratio, Runs 1 and 4, the soot yield may be decreased from about 9.0% to 4.1% (basis weight of carbon in the fuel).

TABLE I

| Feed to Generator | Run No. | | | | |
| --- | --- | --- | --- | --- | --- |
| | 1 | 2 | 3 | 4 | 5 |
| $Na^+$ in water (ppm) | 0 | 0 | 2300 | 4100 | 09460 |
| O/C, atomic ratio | 0.85 | 0.92 | 0.91 | 0.87 | 0.91 |
| $H_2O$/fuel (lb.per lb.) | 0.19 | 0.31 | 0.33 | 0.33 | 0.31 |
| Effluent Gas from Generator | | | | | |
| Soot, wt. % (basis C in fuel) | 9.04 | 4.58 | 3.40 | 4.10 | 4.05 |
| $CH_4$, Mole % (dry basis) | 1.25 | 1.16 | 1.60 | 2.71 | 1.15 |

Obviously many modifications and variations of the invention as hereinbefore set forth may be made without departing from the spirit and scope thereof, and

I claim:

1. In a continuous process for the production of gaseous mixtures comprising $H_2$, CO, $CO_2$, $H_2O$, and optionally containing gases from the group $H_2S$, COS, $CH_4$, Ar, $N_2$ and mixtures thereof and containing particulate carbon by the partial oxidation of a hydrocarbonaceous or oxygenated hydrocarbonaceous fuel containing less than about 300 parts per million (basis weight of said hydrocarbonaceous or oxygenated hydrocarbonaceous fuel) of alkali metal ions selected from the group Na, K, Li, or mixtures thereof with a free-oxygen containing gas in an amount providing an atomic ratio of oxygen to carbon in the hydrocarbonaceous or oxygenated hydrocarbonaceous fuel in the range of about 0.80 to 1.1 in the presence of a temperature moderator, said partial oxidation reaction taking place in the free-flow unpacked reaction zone of a gas generator at an autogenous temperature in the range of about 1500° to 3500°F and a pressure in the range of 1 to 200 atmospheres, the improvement comprising introducing into said reaction zone along with said reactants a supplemental amount of alkali metal compound selected from the group of compounds consisting of carbonates, bicarbonates, hydroxides, silicates, sulfates, sulfites, aluminates, stearates, oleates, naphthenates, acetates, borates, and hydrates of said compounds, wherein said alkali metal portion is selected from the group consisting of Na, K, Li, and mixtures thereof to raise the level of said alkali metal in the reaction zone to above 350 parts per million (basis weight of hydrocarbonaceous or oxygenated hydrocarbonaceous fuel).

2. The process of claim 1 wherein said temperature moderator is $H_2O$, the atomic ratio of oxygen to carbon is in the range of about 0.84 to 0.97, and said alkali metal compound is introduced into said reaction zone in admixture with said $H_2O$ to raise the level of said alkali metals in the reaction zone to a value in the range of about 350 to 13,000 parts per million (basis weight of hydrocarbonaceous fuel).

3. The process of claim 1 wherein said alkali metal compound is sodium carbonate.

4. In a continuous process for the production of gaseous mixtures comprising $H_2$, CO, $CO_2$, $H_2O$, and optionally gases from the group $H_2S$, COS, $CH_4$, Ar, $N_2$ and mixtures thereof and containing particulate carbon by the partial oxidation of a hydrocarbonaceous or oxygenated hydrocarbonaceous fuel containing up to 300 parts per million (basis weight of said hydrocarbonaceous or oxygenated hydrocarbonaceous fuel) of an alkali metal ion selected from the group Na, K, Li, and mixtures thereof, with a free-oxygen containing gas in an amount providing an atomic ratio of oxygen to carbon in the hydrocarbonaceous or oxygenated hydrocarbonaceous fuel in the range of about 0.80 to 1.1, in the presence of a temperature moderator, said partial oxidation reaction taking place in the free-flow unpacked reaction zone of a gas generator at an autogenous temperature in the range of about 1,500° to 3,500°F. and at a pressure in the range of about 1 to 200 atmospheres, the improvement comprising (1) introducing into said reaction zone along with said reactants a supplemental amount of alkali metal compound selected from the group of compounds consisting of carbonates, bicarbonates, hydroxides, silicates, sulfates, sulfites, aluminates, stearates, oleates, naphthenates, acetates, borates, and hydrates of said compounds, wherein said alkali metal portion is selected from the group consisting of Na, K, Li, and mixtures thereof to increase the level of said alkali metal in the reaction zone to a value in the range of about 350 to 13,000 parts per million (basis weight of hydrocarbonaceous or oxygenated hydrocarbonaceous fuel); (2) quenching and scrubbing the effluent gas stream from the reaction zone with water in a quench and scrubbing zone producing a clean product gas stream and a water dispersion comprising particulate carbon, compounds of heavy metals from the group Ni, V, Fe, and mixtures thereof, and dissolved alkali metal compounds from the group Na, K, Li, and mixtures thereof; (3) separating said clean product gas stream from said water dispersion; (4) separating water containing said dissolved alkali metal compounds from said water dispersion; and (5) returning a portion of said separated water to the reaction zone in (1) as at least a portion of said temperature moderator and to provide said supplemental amount of alkali metal.

5. The process of claim 4 provided with the step of returning a portion of the water separated in step (4) to the quench and scrubbing zone in step (2).

6. The process of claim 4 provided with the step of recovering a flocculent suspension of said heavy metals from the group Ni, V, Fe, and mixtures thereof from said water dispersion.

7. The process of claim 1 wherein at least a portion of said supplemental amount of alkali metal compound is introduced into the reaction zone in admixture with said hydrocarbonaceous fuel.

8. The process of claim 1 wherein said hydrocarbonaceous fuel is a liquid hydrocarbonaceous fuel selected from the group consisting of liquefied petroleum gas, crude oil, crude residue, heavy distillates from crude oil, tar-sand oil, shale oil, coal oil, coal tar, aromatic hydrocarbons, cyclic gas oil from fluid-catalytic-cracking operation, furfural extract of coker gas oil, and mixtures thereof.

9. The process of claim 1 wherein said hydrocarbonaceous fuel is a pumpable slurry of solid carbonaceous fuel from the group coal, particulate carbon, petroleum coke, concentrated sewage sludge, and mixtures thereof in water, oil, and water and oil mixtures.

10. The process of claim 1 wherein said oxygenated hydrocarbonaceous fuel is selected from the group consisting of: carbohydrates, cellulosic materials, aldehydes, organic acids, alcohols, ketones, oxygenated fuel oil, waste products and by-products from chemical processes containing oxygenated hydrocarbonaceous organic materials and mixtures thereof.

11. The process of claim 1 wherein said hydrocarbonaceous fuel is a gaseous hydrocarbon fuel selected from the group consisting of methane, ethane, propane, butane, pentane, natural gas, water-gas, coke-oven gas, refinery gas, acetylene tail gas, ethylene off-gas, synthesis gas, and mixtures thereof.

* * * * *

UNITED STATES PATENT AND TRADEMARK OFFICE
CERTIFICATE OF CORRECTION

PATENT NO. : 3,920,579
DATED : November 18, 1975
INVENTOR(S) : William L. Slater It is certified that error appears in the above-identified patent and that said Letters Patent are hereby corrected as shown below:

Col. 6, In Table I Run No. 5 for $Na^+$ in water (ppm)

Change "09460" to -- 460 --

Signed and Sealed this

Thirteenth Day of June 1978

[SEAL]

Attest:

RUTH C. MASON
Attesting Officer

DONALD W. BANNER
Commissioner of Patents and Trademarks